Figure 1:
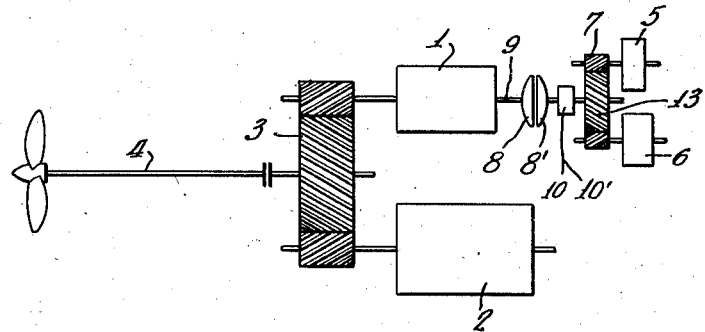

June 5, 1934.  G. BAUER  1,961,953

SHIP PROPELLING PLANT

Filed Jan. 11, 1933

INVENTOR
*Gustav Bauer*
BY
ATTORNEYS

Patented June 5, 1934

1,961,953

UNITED STATES PATENT OFFICE 1,961,953

SHIP PROPELLING PLANT

Gustav Bauer, Hamburg, Germany

Application January 11, 1933, Serial No. 651,095
In Germany January 13, 1932

8 Claims. (Cl. 60—102)

This invention relates to power plants for the propulsion of vehicles such as ships and of the type in which the main motor is employed for full speed operations and a separate or auxiliary motor is employed for cruising at lower speed.

The main object of the invention is to provide connecting means between the motors, whereby the ship may be propelled by either motor and undue acceleration or even idling of the cruising motor is prevented when the main motor is in use.

In carrying out my invention the cruising motor is connected through a hydraulic coupling of the Föttinger or kinetic type and which permits variable slip between the driving and driven rotors depending upon the extent to which the coupling is filled with liquid. When such a coupling is emptied of liquid and one of the rotors is driven at high speed, the air circulation or ventilation produced by the vanes in the coupling exerts a considerable drag upon the other rotor and a tendency to rotate the latter. If the parts connected to the last mentioned rotor be free to rotate their speed due to such ventilation or air circulation in the hydraulic coupling may be higher than the speed at which they were intended to rotate, and serious difficulties or even danger may result. For that reason it has not heretofore been considered practical to connect such auxiliary motor through a hydraulic coupling of the kinetic type to the main motor because the latter is designed and intended to drive the ship at a very much higher speed than that resulting from the use of the cruising motor.

It has been proposed to use magnetic couplings or hydraulically operated clutches of the Metten type or conventional friction clutches for connecting the cruising motor, but the magnetic couplings are very expensive and complicated, and the Metten type of hydraulically operated clutch is limited in transmission output, and simple friction clutches are very unreliable.

By means of my invention I have overcome all such objections and eliminated such dangers, and have provided a simple and effective means which will permit the cruising motor to remain at rest or be rotated at very low speed during the propulsion of the ship at high speed by the driving motor and without causing any detrimental stresses in the rotating elements of the cruising motor or parts connected thereto.

As one feature of my invention I employ a fluid brake in combination with the hydraulic coupling of the Föttinger type, one part of said brake being rigid with the driving member of the hydraulic coupling and rotatable therewith, and the other member being rigidly connected to a stationary structure.

As another feature of my invention I employ a coupling of the jaw, tooth, bolt, or similar type, which is connected in series with the hydraulic coupling and the cruising motor so that it is possible to operate the main motor without either dragging the cruising motor or encountering the losses due to slippage and braking if the rotor of the coupling which is connected to the cruising motor be retarded or held stationary by a friction or fluid brake.

As another feature of my invention I interlock the controls of the motive fluid supply to the motor and the liquid supply to the hydraulic coupling and the fluid brake in such manner that the hydraulic coupling is emptied and the fluid brake is filled when the cruising motor is stopped, and the brake emptied and the hydraulic coupling filled when the cruising motor is to be operated for ship propulsion purposes.

As another feature both the brake and the hydraulic coupling are emptied of driving fluid if the mechanical and interlocking clutch is uncoupled, thereby reducing the resistance and friction losses to the minimum during continued full speed propulsion by the main motor.

As an important advantage of the invention the main motor may be put into service at any time because the cruising motor is automatically disengaged when the main motor is put into operation. The cruising motor may be engaged or disengaged at any time and entirely free of shocks or undue acceleration of masses which would cause undesirable stresses in the transmission members. The cruising motor may be completely and reliably disconnected from the main propelling unit so that overhauling or repairing may be done on the cruising unit when the main propelling unit is operating.

Figure 2:
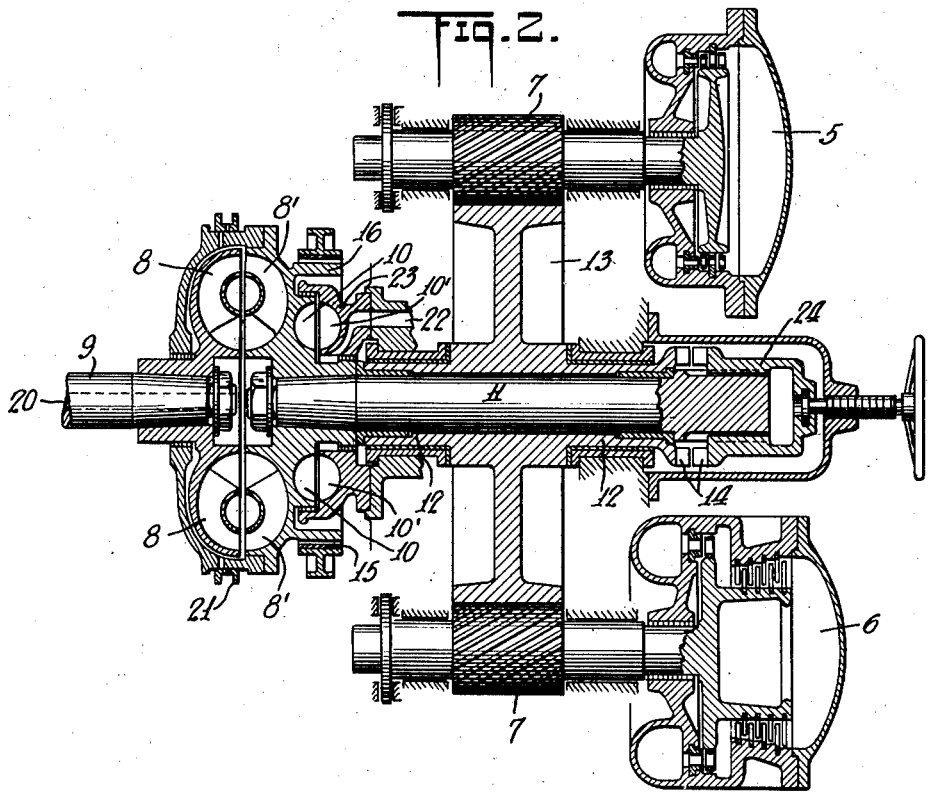

In the accompanying drawing:

Fig. 1 illustrates somewhat diagrammatically one embodiment of the invention, and Fig. 2 is a central longitudinal section through the cruising unit and coupling parts.

In carrying out the invention the motors of the main unit and the cruising unit may be any suitable type of prime mover, and by the term "motor" I therefore include not only electric motors, but also steam and gas turbines, reciprocating steam engines, Diesel and other oil engines. I also include in the term "motor" one or any desired number of such prime movers. Such motors will ordinarily be of the reversible type for driving the ship ahead or astern without the use of reversing gearing.

In the arrangement illustrated in Fig. 1, there are provided two prime movers 1 and 2 connected through a reduction gearing 3 to the main propeller shaft 4. There is also provided a cruising unit including two prime movers 5 and 6 connected through reduction gearing 7, 13, a fluid brake 10, 10', and a hydraulic coupling 8, 8' to the shaft 9 of the prime mover 1. Certain of these parts are shown more in detail in Fig. 2.

The pinions 7 of the reduction gearing 7, 13 are on the shafts of the rotors of the prime movers 5 and 6 and mesh with the gear 13 which encircles the shaft 11 and may rotate in respect thereto or be locked rigid therewith.

The hub of the gear 13 may be formed integral with a hollow shaft 12 mounted in gearings in the main frame, and the shaft 11 may be mounted in bearings within the hollow shaft 12.

The shaft 11 is connected to the driving member 8' of the hydraulic coupling and this driving member may be connected to a casing part which encircles the driven member 8 of the hydraulic coupling and which latter may be connected to the shaft 9.

The hydraulic coupling may be of any suitable type, but preferably of the Föttinger or Vulcan type disclosed in the Föttinger Patent 1,199,359, and the liquid may be supplied thereto through a conduit 20. The emptying of the coupling may be effected by any suitable valve mechanism, as for instance, an axially movable control ring 21 of the type indicated in the Bauer, Wälde and Kluge Patent 1,613,154 or the spindle type shown in the Schmieske Patent 1,866,424 or by any other suitable means.

Operatively associated with the hydraulic coupling is a hydraulic brake including a vaned member 10 rigid or integral with the driving member 8' of the hydraulic coupling, and a vaned member 10' juxtaposed thereto and rigidly connected to a stationary part, for instance, a frame supporting the bearings for the gear 13. The two vaned parts of the fluid brake are juxtaposed so that if the chamber be filled with liquid a drag or high resistance will be offered to the rotation of the driving member 8' of the hydraulic coupling. The dimension of this brake in relation to the hydraulic coupling used will determine the maximum number of R. P. M. of the cruising unit at any given speed of the main unit. The brake may be used as an additional mass giving a flywheel effect to improve the smooth running of the cruising motor, and such braking effect will be the same irrespective of the direction of rotation. This brake is provided with a liquid supply conduit 22 and an outlet 23 whereby a chamber of the fluid brake may be filled or emptied at will. Suitable stuffing boxes are provided to prevent undue leakage of the driving medium from the brake. The liquid discharged from the coupling may be delivered directly into the brake if desired, or the brake and the coupling may have independent liquid supply sources. Should it be desirable to accelerate the emptying of the fluid brake, compressed air or other such means may be used. If the hydraulic coupling and the brake be directly connected, the centrifugal force of fluid discharged from the hydraulic coupling may be utilized to force the liquid into the brake.

The driving rotor 8' of the hydraulic coupling is also provided with a friction brake which may include a brake drum 16 integral with or secured to the driving rotor 8' of the hydraulic coupling and encircled by a controllable band 15.

The shaft 11 and the gear 13 of the reduction gearing are provided with a positively connecting non-slip mechanical clutch, whereby these parts may be interlocked or freed from each other.

As illustrated the shaft 11 is provided with a sleeve 24 keyed thereto so as to be held against relative rotation, but axially slidable thereon. The end of this sleeve is juxtaposed to the end of the hollow shaft 12 and the two opposed ends are provided with jaw teeth 14, whereby upon moving the sleeve 24 in one direction the gear 13 and the shaft 11 are freed to permit relative rotation, while upon moving the sleeve 24 in the opposite direction the two parts are locked together. It will be noted that this mechanical non-slipping clutch is thus in series with the hydraulic clutch.

In operation the parts may be controlled to fill or empty the hydraulic coupling, fill or empty the brake, apply or release the friction brake, connect or disconnect the mechanical clutch, and supply motive fluid to either the main prime movers 1 and 2 or the cruising prime movers 5 and 6.

For normal full speed operation, the motive fluid is shut off from the cruising prime movers 5 and 6, the hydraulic coupling is emptied, and the hydraulic brake is filled. Thus the rotor 8 of the coupling will be driven by the prime mover 1, and the tendency of the rotor 8' of the hydraulic coupling to rotate therewith due to ventilation in the coupling will be retarded by the fluid brake so that the cruising prime movers will rotate at a comparatively low speed, if at all. When the full speed operation is to be continued for any length of time, the brake 15 may be applied to lock the rotor 8' against rotation so that the shaft 11 and the prime movers 5 and 6 will come to rest. The mechanical clutch 24 may then be disengaged and the brake 15 released. The rotor 8' will thus be free to rotate due to ventilation in the coupling, but will not drive any part of the cruising unit other than the shaft 11.

The liquid of the hydraulic brake may be withdrawn so that there will be the minimum resistance to the free rotation of the rotor 8', such resistance being due to the slight drag caused by ventilation in the fluid brake and the friction of the bearing of the shaft 11. There will thus be the minimum waste of the power of the prime movers of the main driving unit.

When it is desired to shift over to the cruising unit, the liquid brake 10, 10' may be filled with liquid to retard the rotation of the shaft 11, the friction brake 15 may be applied to positively stop this shaft, and the mechanical clutch 24 may then be engaged without jar or shock on any rotating parts. When the mechanical clutch 24 has been engaged, the brake 15 may be released, the fluid brake is permitted to empty, the hydraulic coupling filled, and the motive fluid shut off from the main prime movers and turned on to the cruising prime movers. The two sections 10 and 10' of the hydraulic brake are formed with a gland or stuffing box between concentric flanges around the periphery. This stuffing box is so constructed that a small amount of liquid can continuously escape so long as there is any liquid within the chamber of the brake. The inlet passage 22 has a very much greater area than said stuffing box so that liquid may be delivered to the brake at a higher rate than it can escape and the brake may be kept filled when desired. By closing the inlet to the brake, the liquid in the brake may rapidly escape through the stuffing box at the periphery and/or the outlet port 23 and thus automatically empty itself. Thus change over from full speed operation may thus be accomplished in a very simple manner without shock, jar or undue strain on any of the parts and in a very brief interval of time.

During full speed driving by the main unit, and when the mechanical clutch 24 is disengaged, the cruising prime movers will be at rest and may be repaired or overhauled without in any way interfering with the proper propulsion of the ship by the main driving unit.

I am aware that it has been proposed to use a fluid brake in connection with a hydraulic coupling of the kinetic type, for instance, as shown in German Patent 426,816, but in such construction the brake is employed solely to facilitate manœuvering and to stop the reversible prime mover preparatory to reversing so as to reduce the time interval between full speed ahead and full speed astern. So far as I am aware such a combination of hydraulic brake and fluid coupling has never heretofore been employed to prevent undue acceleration of an auxiliary cruising unit during the period when the main driving unit is operating.

In normal full speed operations the supply of fuel to the prime movers 1 and 2 is on, and the supply of fluid to the hydraulic brake is on. The supply of fluid to the cruising prime movers 5 and 6 is off and the supply of fluid to the main hydraulic clutch is off.

During cruising the supply of fuel to the main prime movers 1 and 2 is off and the supply of fluid to the hydraulic brake is off, but the motive fluid is on to the cruising prime movers 5 and 6 and the fluid is on at the hydraulic clutch.

These and the other operations previously referred to may be accomplished by interconnecting the various control members so that the motive fluid cannot be supplied to both the main prime movers and the cruising prime movers at the same time, and the mechanical clutch cannot be operated while there is operating fluid in the hydraulic clutch or motive fluid being supplied to the cruising motors. This interconnection may be accomplished by an oil relay system with cylinders and pistons connected to the various control members and with suitable valves in the relay system, or may be accomplished in any suitable manner, for example by interconnection of mechanical levers and links.

Having thus described my invention, what I claim as new and desire to secure by Letters Patent is:

1. A ship propelling plant including a main motor for driving the ship at full speed, a cruising motor for driving the ship at reduced speed, a hydraulic coupling of the Föttinger type between said motors and including a pair of juxtaposed rotors, each operatively connected to one of said motors, a fluid brake for retarding rotation of the rotor connected to the cruising motor, and control means for filling or emptying said hydraulic coupling and emptying or filling said fluid brake.

2. A ship propelling plant including a main motor for driving the ship at full speed, a cruising motor for driving the ship at reduced speed, a hydraulic coupling of the Föttinger type between said motors and including a pair of juxtaposed rotors, each operatively connected to one of said motors, a positively acting non-slip clutch in the connection between said cruising motor and its associated rotor of the coupling, and friction means for preventing or permitting rotation of said last mentioned rotor.

3. A ship propelling plant having a main power unit, a cruising unit adapted to drive the ship at lower speed, a hydraulic coupling of the Föttinger type having a driving member connected to said cruising unit and a driven member connected to said main unit, and a brake associated with said driving member for preventing undue acceleration of said driving member and said cruising unit when the ship and said driven member are propelled by said main power unit and said hydraulic coupling is empty.

4. A ship propelling plant having a main power unit, a cruising unit adapted to drive the ship at lower speed, a hydraulic coupling of the Föttinger type having a driving member connected to said cruising unit and a driven member connected to said main unit, and a hydraulic brake associated with said driving member for preventing undue acceleration of said driving member and said cruising unit when the ship and said driven member are propelled by said main power unit and said hydraulic coupling is empty, said brake including a pair of members forming a liquid chamber, one of the members of said brake being stationary and the other being rigid with the driving member of said coupling.

5. A ship propelling plant including a main driving motor for driving the ship at full speed, a cruising motor for driving the ship at lower speed, a hydraulic coupling of the Föttinger type having a driving rotor and a driven rotor, said driven rotor being connected to said main driving motor, and a mechanical non-slip clutch for positively connecting said cruising motor to the driving rotor of said hydraulic coupling, whereby when the ship is driven by the main driving motor and the hydraulic coupling is empty the cruising motor may be freed from torque of the hydraulic coupling.

6. A ship propelling plant having a main power unit, a cruising unit adapted to drive the ship at lower speed, a hydraulic coupling of the Föttinger type having a driving member and a driven member, said driven member being connected to said main power unit, a mechanical non-slip clutch connecting said driving member and said cruising unit, and a brake for positively stopping said driving member when said coupling is empty whereby the cruising unit may be readily connected to or disconnected from said hydraulic coupling.

7. A ship propelling plant including a propeller shaft, a main motor connected to said shaft for driving the ship at full speed, a cruising motor for driving the ship at reduced speed, an intermediate shaft, reduction gearing driven by said cruising unit, a non-slip mechanical clutch connecting said reduced gearing and said intermediate shaft, and a hydraulic coupling of the Föttinger type including a driving member connected to said intermediate shaft and a driven member connected to said main motor.

8. A ship propelling plant including a propeller shaft, a main motor connected to said shaft for driving the ship at full speed, a cruising motor for driving the ship at reduced speed, an intermediate shaft, reduction gearing driven by said cruising unit, a non-slip mechanical clutch connecting said reduction gearing and said intermediate shaft, a hydraulic coupling of the Föttinger type including a driving member connected to said intermediate shaft and a driven member connected to said main motor, and a brake connected to the driving member of said coupling for stopping the latter and said intermediate shaft when said coupling is empty and said cruising motor is idle.

GUSTAV BAUER.